United States Patent [19]

Lazich et al.

[11] 4,189,022
[45] Feb. 19, 1980

[54] AUTOMATICALLY RELEASING SEAT BELT ANCHOR

[76] Inventors: Radovan P. Lazich, 2735 Kroy Way, Sacramento, Calif. 95817; Adolph P. Cascardo, 2233 Mission Ave., Carmichael, Calif. 95608

[21] Appl. No.: 946,044

[22] Filed: Sep. 26, 1978

[51] Int. Cl.² ............................................. A62B 35/02
[52] U.S. Cl. ..................................... 180/268; 280/801
[58] Field of Search ......... 280/744; 180/82 C, 103 A; 297/385; 307/105 B

[56] References Cited

U.S. PATENT DOCUMENTS

| | | | |
|---|---|---|---|
| 3,177,966 | 4/1965 | Schoeffler et al. | 280/744 X |
| 3,235,930 | 2/1966 | Chapin et al. | 297/385 X |
| 3,311,188 | 3/1967 | Gutshall | 180/82 C |
| 3,961,680 | 6/1976 | Miescher | 180/82 C |
| 4,004,821 | 1/1977 | Breitschwerdt et al. | 280/744 |
| 4,049,293 | 9/1977 | Bouju | 280/744 |

Primary Examiner—Joseph F. Peters, Jr.
Assistant Examiner—D. W. Underwood
Attorney, Agent, or Firm—C. A. O'Brien; Harvey B. Jacobson

[57] ABSTRACT

A seat belt assembly having opposite end portions and first and second anchor structures for anchoring the opposite end portions of the belt assembly relative to a vehicle is provided. One of the anchor structures is provided with latch structure releasably anchoring the corresponding belt assembly end portion and includes actuator structure operative, when actuated, to release the corresponding end portion from the one anchor structure. A first end portion of the belt assembly includes a flexible section thereof and control structure is provided for the actuator structure including a portion shiftable between first and second positions and the shiftable portion is engaged with the flexible belt end portion section deflecting the latter from a generally straight condition and operative to increasingly deflect the flexible portion in response to shifting from the second position thereof toward the first portion. Also, retaining structure is provided operative to releasably retain the shiftable portion in the first position and to release the shiftable portion for movement toward the second position thereof in response to greater than minimum tensioning of the flexible section. The control structure includes time delay structure operative to actuate the actuator structure in response to movement of the shiftable portion from the first position thereof to the second position thereof.

8 Claims, 8 Drawing Figures

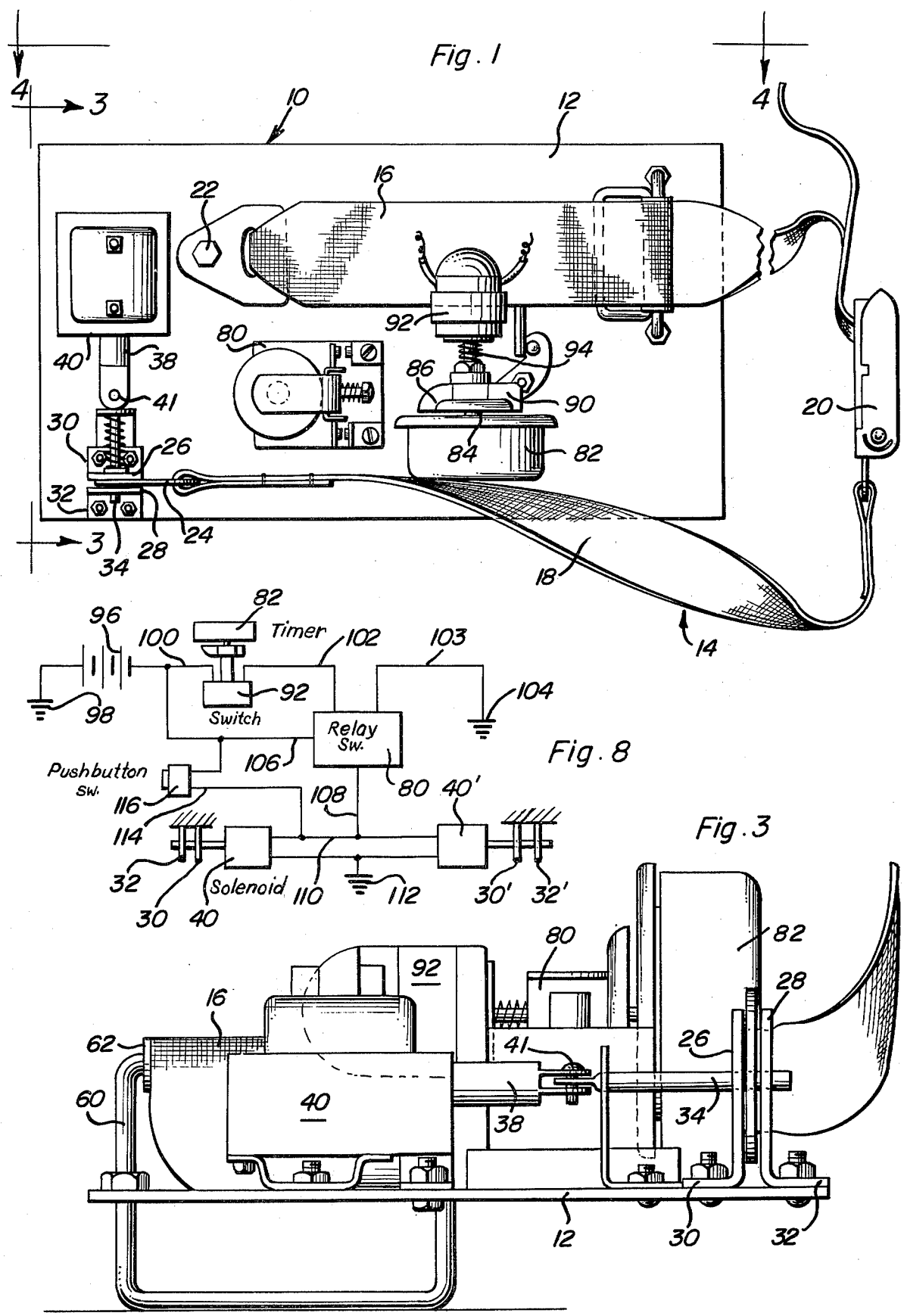

U.S. Patent  Feb. 19, 1980  Sheet 2 of 2  4,189,022
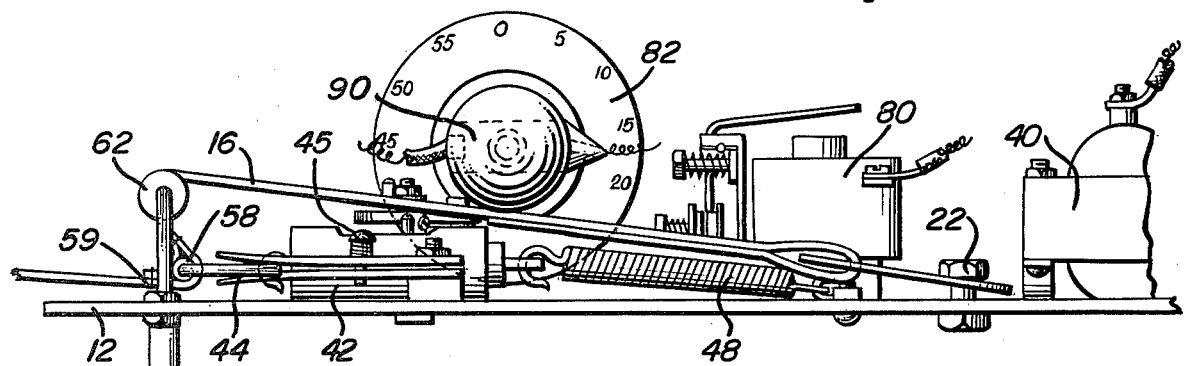
Fig. 4
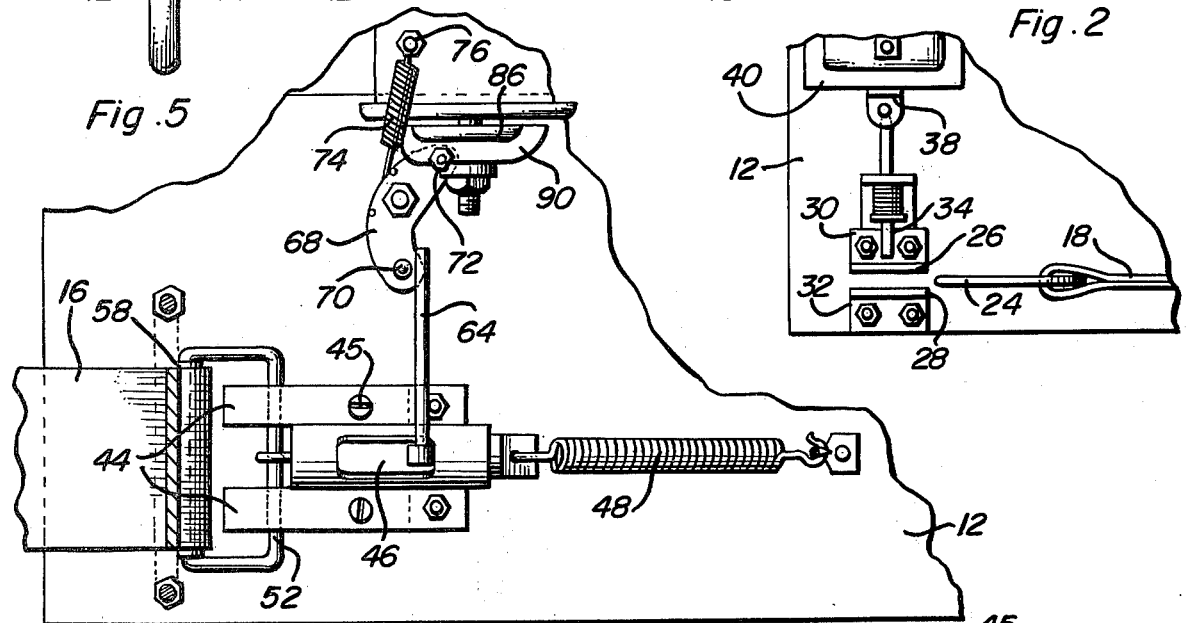
Fig. 5
Fig. 2
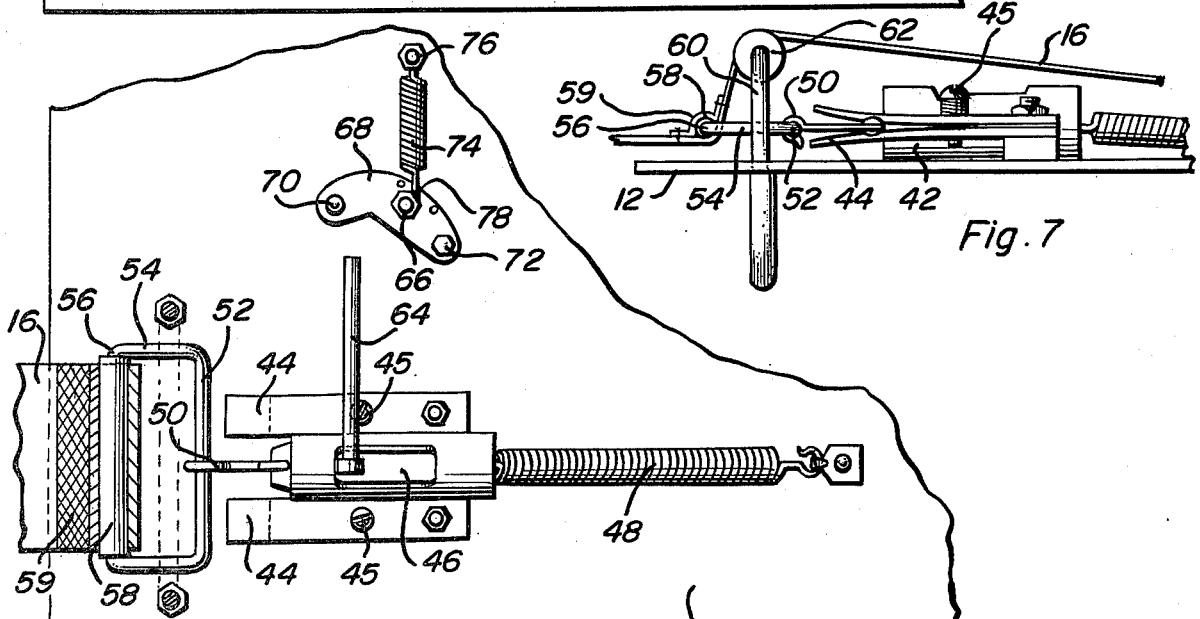
Fig. 7
Fig. 6

AUTOMATICALLY RELEASING SEAT BELT ANCHOR

BACKGROUND OF THE INVENTION

The automatically releasing seat belt anchor of the instant invention has been designed to release the driver and/or passengers of a vehicle, in a time delayed manner, in response to more than minimal tensioning of the seat belt assembly of the driver of the vehicle. If a plurality of seat belt assemblies within the same vehicle are to be of the automatically releasing type, they are all operatively connected to the time delay seat belt releasing structure of the seat belt for the driver of the vehicle. In addition, the seat belt releasing structure includes manually operable override control.

Various forms of automatically releasing seat belt anchor structures have been heretofore designed and include structure for releasing the associated seat belt from an anchored condition in a time delay manner responsive to tensioning of the associated seat belt beyond a predetermined minimum. However, these automatic seat belt releasing mechanisms have all been operatively associated with the anchor point of the associated seat belt in a manner such that secure anchoring of the seat belt, under various conditions, could be adversely affected by the automatic release mechanism. Examples of various forms of previously known automatic seat belt releasing assemblies are disclosed in U.S. Pat. Nos. 3,177,966, 3,235,930, 3,311,188, 3,961,680, 4,004,821 and 4,049,293.

BRIEF DESCRIPTION OF THE INVENTION

The automatic releasing seat belt anchor structure of the instant invention includes control structure responsive to tensioning of the associated seat belt beyond a predetermined minimum, but not directly associated with the seat belt anchor location under the control of the control structure. Rather, the control structure is operatively associated with an intermediate portion of one end portion of the associated seat belt and, in response to tensioning of that end portion of the seat belt, actuates a release mechanism releasing one of the end portions of the seat belt from an anchored condition. In this manner, failure of the control mechanism in any manner is prevented from interferring with dependable operation of the anchor structure.

The main object of this invention is to provide a dependable automatically releasing seat belt anchor capable of releasing an associated seat belt in a time delayed manner responsive to at least one section of the associated seat belt experiencing tension beyond a predetermined minimum.

Another object of this invention is to provide an automatically releasing seat belt anchor which may be readily mounted in substantially all forms of vehicles.

Still another object of this invention is to provide an apparatus in accordance with the preceding objects and including an actuator therefor operative to actuate a plurality of seat belt anchor releases in the same vehicle.

Yet another object of this invention is to provide an automatically releasing seat belt anchor which will not in any way reduce the strength of a seat belt system or affect the efficiency of operation thereof.

A final object of this invention to be specifically enumerated herein is to provide an automatically releasing seat belt anchor which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of an automatically releasing seat belt anchor constructed in accordance with the present invention;

FIG. 2 is a fragmentary top plan view of the lower left hand portion of FIG. 1 in a release condition;

FIG. 3 is an enlarged end elevational view of the assemblage illustrated in FIG. 1 as seen from the left side thereof;

FIG. 4 is a fragmentary elevational view of the assemblage illustrated in FIG. 3 on somewhat of a reduced scale and as seen from the left side of FIG. 3;

FIG. 5 is a fragmentary enlarged top plan view of the upper right hand portion of the assemblage of FIG. 1 illustrating the release control actuator in the inoperative position, parts of the seat belt anchor being omitted and illustrated in horizontal section for clarity;

FIG. 6 is a fragmentary top plan view similar to FIG. 5 but illustrating the seat belt anchor release control actuator in the operative position;

FIG. 7 is a fragmentary side elevational view of the assemblage illustrated in FIG. 6; and FIG. 8 is a diagrammatic view of the electrical circuit of the seat belt anchor.

DETAILED DESCRIPTION OF THE INVENTION

Referring now more specifically to the drawings, the numeral 10 generally designates the automatically releasing seat belt anchor assembly of the instant invention. The seat belt anchor assembly 10, as illustrated, is mounted upon a mounting panel 12 and it is to be noted that the mounting panel 12 may comprise a specific mounting panel for the seat belt anchor, or the floor of an associated vehicle.

The seat belt anchor 10 includes a seat belt assembly referred to in general by the reference numeral 14 and including belt sections 16 and 18 removably coupled together at one pair of corresponding ends by means of a buckle assembly 20. The end of the belt section 16 remote from the buckle assembly 20 is anchored relative to the panel 12 in a conventional manner by means of an anchor fastener 22. However, the corresponding end of the belt section 18 includes an apertured anchor plate 24 received between upstanding flanges 26 and 28 of a pair of anchor brackets 30 and 32 anchored to the panel 12. An anchor pin 34 projects through the apertured flanges 26 and 28 as well as the apertured plate 24 and thus latches the anchor plate 24 to the panel 12. The pin 34 has the armature 38 of an electrical solenoid 40 pivotally attached thereto as at 41 and the solenoid 40 is anchored relative to the panel 12 in any conventional manner.

A tubular mounting guide 42 is stationarily mounted on the panel 12 and includes a pair of adjustable spring type opposing jaw clamps 44 on opposite sides of the guide 42 including adjustment screws 45 and a follower 46 is mounted within the guide 42 for reciprocation therein. An expansion spring 48 is operatively connected between one end of the follower 46 and the plate 12 and yieldingly biases the follower 46 to the right as viewed in FIGS. 5 and 6. Also, the end of the follower remote from the spring 48 projects outwardly of the guide 42 and defines an anchor hook 50 engaged with one longitudinal side 52 of a D-ring. The D-ring 54 includes a second longitudinal side 56 upon which a sleeve 58 is journaled, the sleeve 58 being spaced horizontally from the clamp 44 and anchored to the belt section 16 by an attaching strap 59 passing over the sleeve 58 and secured by stitching at its opposite ends to the belt section 16. Also, an inverted U-shaped stand 60 is supported from the panel 12 and journals a roller 62 from its upper bight portion. The roller 62 is spaced vertically above the sleeve 58 in FIG. 5 and the side 52 of the D-ring 54 has its opposite ends releasably clamped in the clamp 44.

The follower 46 includes a laterally outwardly projecting arm 64 and an upstanding support 66 supported from the panel 12 oscillatably supports a horizontal lever 68 from its upper end. The lever 68 includes an upwardly projecting abutment 70 on one end and a second upwardly projecting abutment 72 on its other end. In addition, an expansion spring 74 is anchored between the panel 12 as at 76 and the lever 68 as at 78 and yieldingly biases the lever toward the two over center positions thereof illustrated in FIGS. 5 and 6.

A relay 80 is anchored relative to the panel 12 and a timer 82 is also anchored relative to the panel 12. The timer 82 includes a rotatable shaft 84 upon which an indicating knob 86 including an outstanding rib 90 is mounted and a switch 92 is supported from the panel 12 and includes a rotary actuator 94 anchored relative to the knob 86.

With attention now invited more specifically to FIG. 8, a battery 96 is provided and grounded as at 98. A conductor 100 extends between the switch 92 and battery 96, a second conductor 102 extends between the timer 82 and the relay 80 and a third conductor 103 grounds the relay 80 as at 104. Accordingly, the timer 82 and the relay 80 are serially connected in a circuit extending between the battery 96 and the ground as at 104 and including conductors 100, 102 and 103.

A fourth conductor 106 comprises a bypass circuit and is electrically connected between the conductor 100 between the battery 96 and the timer 82 and the relay 80 and the relay 80 is electrically connected to the solenoid 40 by means of conductors 108 and 110, the solenoid 40 being grounded as at 112. In addition, a bypass circuit 114 having a push button switch 116 serially connected therein is electrically connected between the conductors 106 and 110. Also, if additional seat belt assemblies within the associated vehicle are provided and to be actuated by the actuator for the seat belt anchor 10, such an additional seat belt may include anchor brackets 30' and 32' corresponding to the brackets 30 and 32 and a solenoid 40' corresponding to the solenoid 40 may be provided and electrically connected to the conductor 110 and the ground 112.

In operation, the seat belt section 16 is trained about the roller 62 and the sleeve 58 in the manner illustrated in FIG. 4 when the follower 46 is in the retracted position. The side 52 of the D-ring 54 is releasably clamped in the clamps 44 and the strength of the clamps 44 and the expansion spring 48 is such to require a predetermined tension of the belt section 16 before the belt section 16 will pull the D-ring 54 from the position illustrated in FIG. 5 outwardly from the clamps 44 to the position illustrated in FIG. 7. During movement of the D-ring 54 from the position thereof illustrated in FIG. 4 to the position thereof illustrated in FIG. 7, the follower 46 shifts from the position thereof illustrated in FIG. 5 to the position thereof illustrated in FIG. 6 and the arm 64 engages the abutment 70 and swings the lever 68 from the over center position illustrated in FIG. 5 passed the center position of the lever and the spring 74 thereby biases the lever 68 to the opposite over center position illustrated in FIG. 6. As the lever 68 swings from the over center position of FIG. 5 to the over center position of FIG. 6, the abutment 72 is swung outwardly from beneath the rib 90 of the knob 86 thereby releasing the knob 86 for angular displacement in a counterclockwise direction from the position thereof illustrated in FIG. 4. Of course, as the knob 86 rotates counterclockwise from the position thereof illustrated in FIG. 4, the rotary actuator or shaft 94 of the switch 92 is turned in order to close the normally open switch 92. By closing the switch 92, the relay 80 is electrically connected to the battery 96 and thus the relay switch 80 is closed in order to electrically connect the solenoid 40 to the battery 96, whereby actuation of the solenoid 40 will cause the pin 34 to be withdrawn from the apertured plate 24, thus releasing the belt section 18. The push button switch 116 may be positioned where it may readily actuated from persons exterior of the associated vehicle in the event it is desired to release the seat belt assembly 14 from exteriorly of the vehicle. Of course, other seat belt assemblies provided in the vehicle may be under the control of additional solenoids, such as the solenoid 40'.

The foregoing is considered as illustrative only of the principles of the invention. Further, since numerous modifications and changes will readily occur to those skilled in the art, it is not desired to limit the invention to the exact construction and operation shown and described, ahd accordingly, all suitable modifications and equivalents may be resorted to, falling within the scope of the invention.

What is claimed as new is as follows:

1. In a vehicle including a seat belt assembly having opposite end portions and first and second anchor structures anchoring the opposite end portions of said belt assembly relative to said vehicle, one of said anchor structures including latch means releasably anchoring the corresponding belt assembly end portion relative to said vehicle and including actuator means operative, when actuated, to release said corresponding end portion from said one anchor structure, one end portion of said assembly including a flexible section thereof, control means for said actuator means including a shiftable portion shiftable between first and second positions, said shiftable portion being engaged with said flexible section deflecting the latter from a generally straight condition and operative to increasingly deflect said flexible section in response to shifting from said second portion toward said first position, retaining means operative to releasably retain said shiftable portion in said first position against predetermined minimum longitudinal tensioning of said flexible section and operative, in response to greater than said minimum tensioning of said flexible section, to release said shiftable portion for movement toward said second position, said control means, in response to movement of said shiftable portion from said first position toward said second position, including means operative to actuate said actuator means.

2. The combination of claim 1 wherein said means operative to actuate said actuator means includes time delay means for delaying actuation of said actuator means for a predetermined length of time after movement of said shiftable portion from said first position toward said second position.

3. The combination of claim 2 wherein said time delay means includes means for adjusting said predetermined length of time.

4. In a vehicle including a seat belt assembly having opposite end portions and first and second anchor structures anchoring the opposite end portions relative to said vehicle, one of said anchor structures including latch means releasably anchoring the corresponding end portion relative to said one anchor structure and including actuator means operative, when actuated, to release said corresponding end portion from said one anchor structure, one end portion of said assembly including a flexible section thereof, control means for said actuator means yieldingly biasing said flexible section from a generally straight condition toward an increasingly laterally deflected position, said control means, responsive to tensioning of said flexible section above a predetermined minimum to return said flexible section from said laterally deflected position toward said generally straight condition, including means operative to actuate said actuator means.

5. The combination of claim 4 wherein said control means includes time delay means responsive to a momentary tensioning of said flexible section above a predetermined minimum to initiate time delayed actuation of said actuator means.

6. The combination of claim 5 wherein said control means includes means operative to vary the time delay interval for actuation of said actuator means subsequent to tensioning of said section above said predetermined minimum.

7. The combination of claim 4 wherein said actuator means comprises an electric solenoid.

8. The combination of claim 7 wherein said control means includes time delay means responsive to a momentary tensioning of said flexible section above a predetermined minimum to initiate time delayed actuation of said actuator means, said time delay means comprising a timer actuated normally open switch serially connected in an electrical circuit with said solenoid, said circuit being adapted for electrical connection to a suitable source of electrical potential.

* * * * *